United States Patent
Yoo et al.

(10) Patent No.: US 6,701,059 B1
(45) Date of Patent: Mar. 2, 2004

(54) METHOD AND APPARATUS FOR RECORDING DIGITAL DATA STREAMS

(75) Inventors: Jea-Yong Yoo, Seoul (KR); Byung-Jin Kim, Kyunggi-do (KR); Kang-Soo Seo, Kyunggi-do (KR); Ki Won Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/477,344

(22) Filed: Jan. 4, 2000

(30) Foreign Application Priority Data

Jan. 4, 1999 (KR) ......................... 1999-00602

(51) Int. Cl.$^7$ .............................. H04N 5/91; H04N 5/85; H04N 7/26
(52) U.S. Cl. ........................... 386/46; 386/109; 386/125
(58) Field of Search .................. 386/66, 109, 111, 386/112, 124, 125, 126, 1, 27, 33, 60, 95, 52, 4; H04N 5/91, 7/26, 5/85

(56) References Cited

U.S. PATENT DOCUMENTS 6,009,229 A * 12/1999 Kawamura 6,470,135 B1 * 10/2002 Kim et al.

FOREIGN PATENT DOCUMENTS

JP 5002834 1/1993
JP 9-251762 9/1997

* cited by examiner

*Primary Examiner*—Robert Chevalier
(74) *Attorney, Agent, or Firm*—Birch, Stewart, Kolasch & Birch, LLP

(57) ABSTRACT

A method for recording digital data streams capable of increasing recording efficiency of a recording medium by recording a transport stream unit across two sectors. Depending upon the size of the remaining area of a sector, a transport stream unit is recorded across two sectors with the result that sectors contain no null data. If the size of the remaining area of the last sector of a stream object unit is less than the size of a transport stream unit, the remaining area is padded with null data. The method for recording digital data streams in accordance with the present invention minimizes the size of the recording area padded with null data, thereby remarkably increasing the recording efficiency of a recording medium.

20 Claims, 6 Drawing Sheets

*Conventional Art*

FIG. 3

| Application Header | | | |
|---|---|---|---|
| Field | Number of bits | Number of bytes | Value |
| VERSION | 8 | 1 | 01h |
| APPLICATION_ID | 16 | 2 | |
| MAX_BITRATE | 32 | 4 | |
| SMOOTH_BUF_SIZ | 16 | 2 | '3540 bytes' |
| TS_REF_CL_FREQ. | 32 | 4 | '27MHz' |
| AP_PKT_LEN | 16 | 2 | |
| TS_LEN | 8 | 1 | 04h |
| AP_PKT_Ns | 8 | 1 | |
| START_OF_STR | 1 | | 0b or 1b |
| END_OF_STR | 1 | 1 | 0b or 1b |
| Reserved | 6 | | 111111b |
| Reserved | 56 | 7 | 7x (FFh) |
| Total | 200 | 25 | |

*Conventional Art*

FIG. 6

| Application Header | | | |
|---|---|---|---|
| Field | Number of bits | Number of bytes | Value |
| VERSION | 8 | 1 | 01h |
| APPLICATION_ID | 16 | 2 | |
| MAX_BITRATE | 32 | 4 | |
| SMOOTH_BUF_SIZ | 16 | 2 | '3540 bytes' |
| TS_REF_CL_FREQ. | 32 | 4 | '27MHz' |
| AP_PKT_LEN | 16 | 2 | |
| TS_LEN | 8 | 1 | 04h |
| AP_PKT_Ns | 8 | 1 | |
| START_OF_STR | 1 | | 0b or 1b |
| END_OF_STR | 1 | 1 | 0b or 1b |
| COM_SZ | 6 | | |
| Reserved | 56 | 7 | 7x (FFh) |
| Total | 200 | 25 | |

METHOD AND APPARATUS FOR RECORDING DIGITAL DATA STREAMS

BACKGROUND OF THE INVENTION

1. Field of the Invention

The present invention generally relates to method and apparatus for recording digital data streams, and more particularly, but not by way of limitation, to method and apparatus for recording transport stream units of a digital data stream in stream object units of a recording medium having sectors of a fixed size.

2. Description of the Related Art

In the conventional analog television broadcast, video signals are transmitted over the air or through cables after being AM or FM modulated. With the recent advance of digital technologies such as digital image compression or digital modulation/demodulation, standardization for digital television broadcast is in rapid progress. Based upon the Moving Picture Experts Group (MPEG) format, satellite and cable broadcast industry also moves towards the digital broadcast.

The digital broadcast offers several advantages that its analog counterpart cannot provide. For example, the digital broadcast is capable of providing services with far more improved video/audio quality, transmitting several different programs within a fixed bandwidth, and offering enhanced compatibility with digital communication media or digital storage media.

In the digital broadcast, a plurality of programs encoded based upon the MPEG format are multiplexed into a single transport stream before transmitted. The transmitted transport stream is received by a set top box at the receiver and demultiplexed into original programs. If a program is chosen from among the demultiplexed programs, the chosen program is decoded by a decoder in the set top box and original audio and video signals are retrieved. The retrieved audio and video signals can be presented by an A/V output apparatus such as a TV.

FIG. 1 depicts a block diagram of a general digital data stream recording apparatus comprising a set top box 100, a communication interface (IEEE-1394), and a streamer 200. The set top box 100 receives transport streams encoded by system encoders and broadcast by a plurality of broadcasting stations and demultiplexes the received transport streams. After a system decoder 120 decodes the transport stream of a program tuned by a tuning unit 110, a control unit 140 outputs the decoded transport stream to an A/V output device such as a TV set for presentation. The set top box 100 may transmit a program chosen by a user to the streamer 200 through the IEEE-1394 interface so that the transmitted program is recorded on a recording medium 230 such as a digital video disk by the streamer 200.

Requested by a user, the set top box 100 may receive a program retrieved from the recording medium 230 by the streamer 200 through the IEEE-1394 communication interface so that the received program can be presented on a TV set after being decoded by the decoder 120.

For recording the received digital broadcast signals on a recording medium, it is necessary to develop schemes for organizing the received digital data streams on the recording medium as groups of stream object units and creating management information for the stream object units. However, no international standard for such schemes is available yet and thus various methods have been proposed by relevant developers.

A conventional method for creating stream object units will be explained with reference to accompanying drawings.

FIG. 2 shows the syntax of several digital data stream recording units. A stream object (SOB), which is a single recorded program, comprises a plurality of stream object units and a stream object unit (SOBU) comprises a plurality of sectors. A sector further comprises a plurality of transport stream packets (TSPs) and header information (HDRS) regarding the transport stream packets.

To be more specific with figures, the size of a transport stream packet is 192 bytes, the size of the header information (HDRS) is 100 bytes, and the size of a sector is 2048 bytes. A sector of 2048 bytes comprises a 100-byte header information (HDRS), 10 192-byte transport stream packets, and a 28-byte padding area padded with null data. The 100-byte header information (HDRS) further comprises a sector header for identifying the sector and several headers. A transport stream packet comprises a 4-byte time stamp representing the packet arrival time and a 188-byte application packet.

FIG. 3 is a detailed view of the application header recorded in the header information area (HDRS). The application header comprises several fields representing the header format version (VERSION), the identification code of the data stream (APPLICATION_ID), the maximum bit transfer rate of the data stream (MAX_BITRATE), the buffer size (SMOOTH_BUF_SZ), the reference clock frequency for packet arrival/transmission (TS_REF_CL_FREQ), the length of a transport stream packet (AP_PKT_LEN), the length of a transport packet arrival time (TS_LEN), the number of transport stream packets (AP_PKT_Ns), the first transport stream packet of the data stream (START_OF_STR), and the last transport stream packet of the data stream (END_OF_STR). The number of 188 representing that the size of a transport stream packet except the time stamp is 188 bytes is recorded in 2 bytes in the field of AP_PKT_LEN and the number of 10 representing that a sector comprises 10 transport stream packets is recorded in 1 byte in the field of AP_PKT_Ns.

According to the conventional method for recording digital data streams, a predetermined number of sectors are grouped into a stream object unit (SOBU) and a sector comprises 100-byte header information (HDRS), 10 192-byte transport stream packets including time stamps, and 28-byte padding area, as shown in FIG. 4, As a result, a stream object unit (SOBU) comprising 32 sectors contains 32 28-byte padding areas and therefore the size of padding areas contained in a stream object unit (SOBU) amounts to 886 bytes. As the padding area contains no useful information, such a recording method severely impairs the recording efficiency of the recording medium.

SUMMARY OF THE INVENTION

It is an object of the present invention to provide method and apparatus for recording digital data streams that minimizes the size of recording area padded with null data.

Method and apparatus for recording digital data streams in accordance with an aspect of the present invention comprises recording received transport stream packets sequentially in a sector and recording a transport stream packet across two sectors when the size of the remaining area of a sector is less than the size of a transport stream unit.

Another method and apparatus for recording digital data streams in accordance with the present invention comprises recording received transport stream packets, checking the size of the recorded transport stream packets, and grouping the received transport stream packets into a stream object unit by adding unwritten area depending upon the checked size information.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings:

FIG. 3 is a pictorial representation of a general application header of transport stream units;

FIG. 6 is a pictorial representation of an application header in accordance with the present invention.

DETAILED DESCRIPTION OF THE PREFERRED EMBODIMENTS

In order that the invention may be fully understood, preferred embodiments thereof will now be described with reference to the accompanying drawings.

Figure 1:
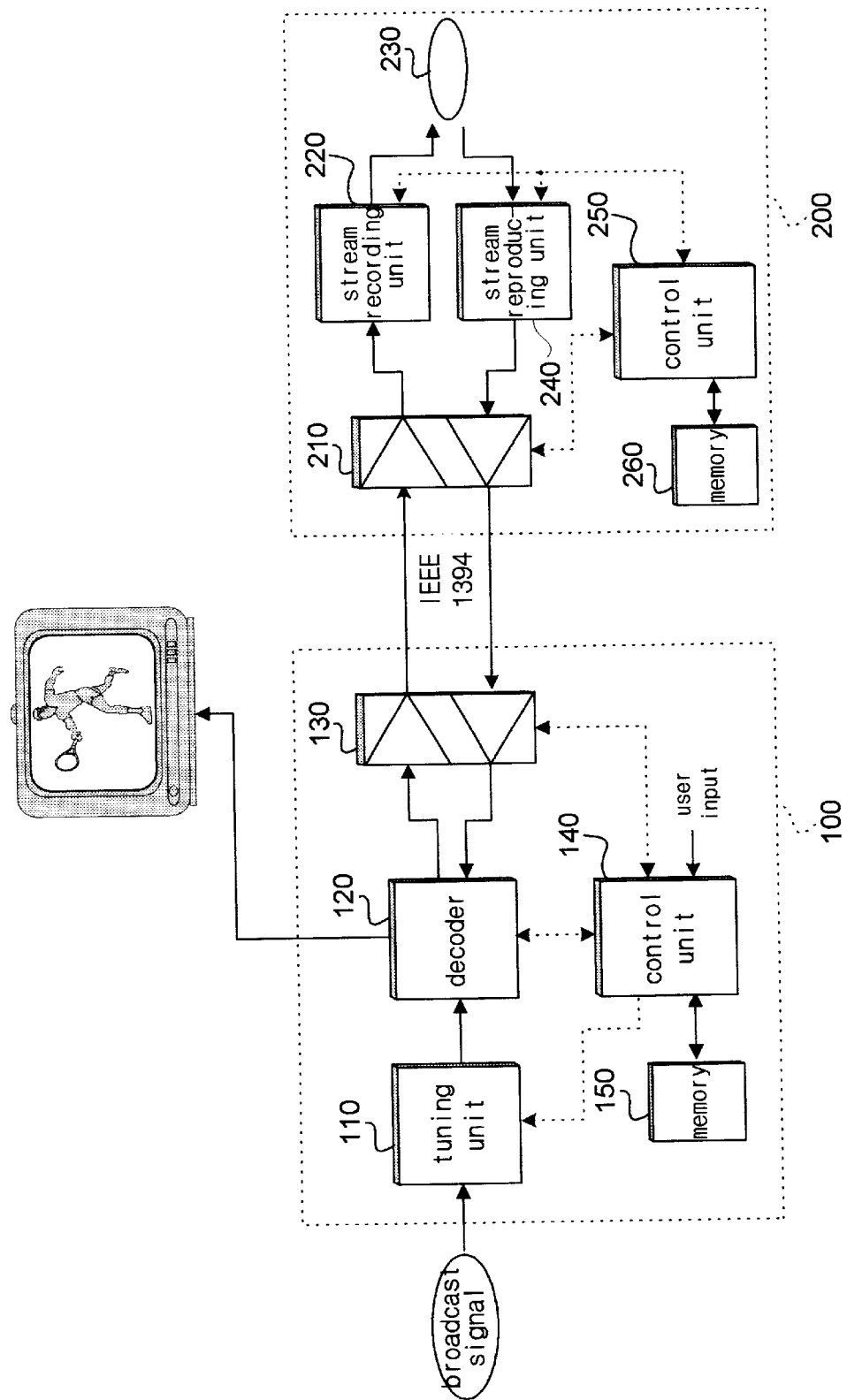
FIG. 1 is a block diagram of a general digital data stream recording apparatus.
Figure 2:
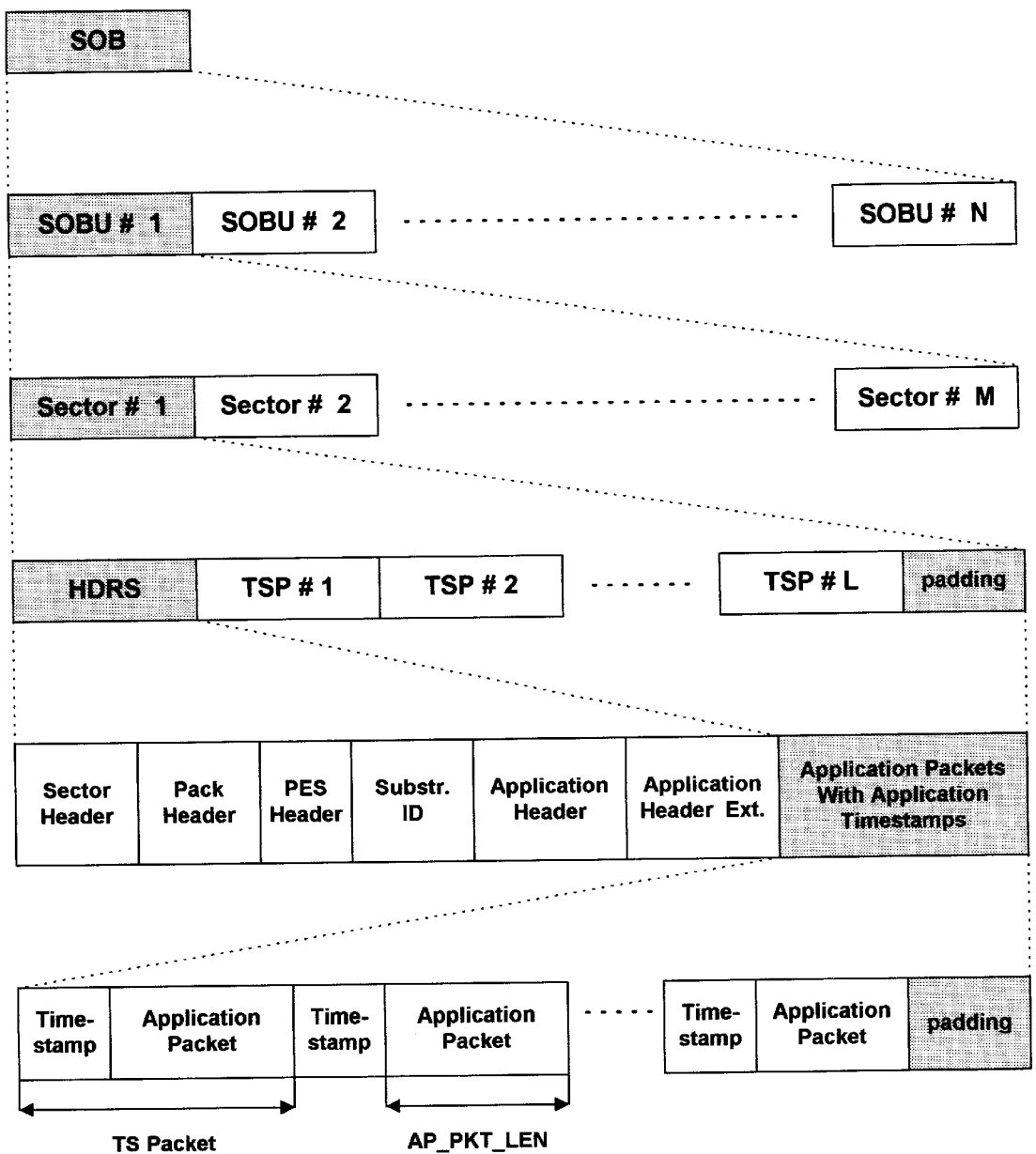
FIG. 2 is a pictorial representation of the syntax of general digital data stream recording units.
Figure 4:
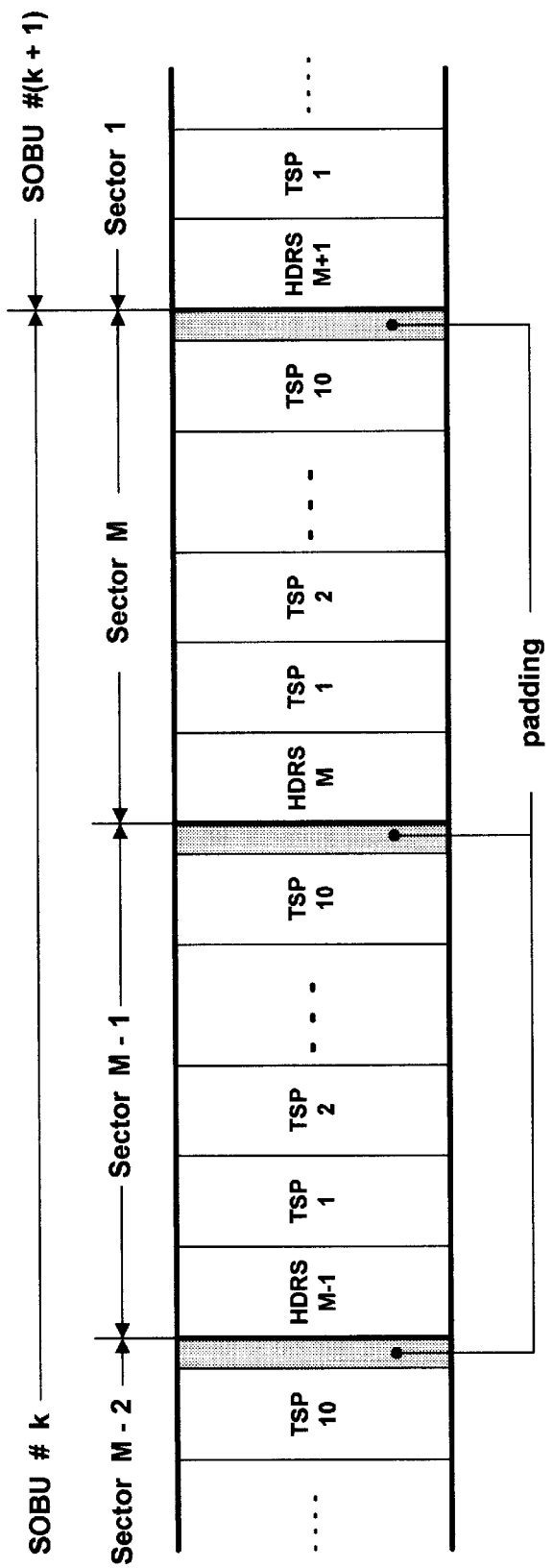
FIG. 4 is a pictorial representation of sectors and stream object units created by the conventional recording method.
Figure 5:
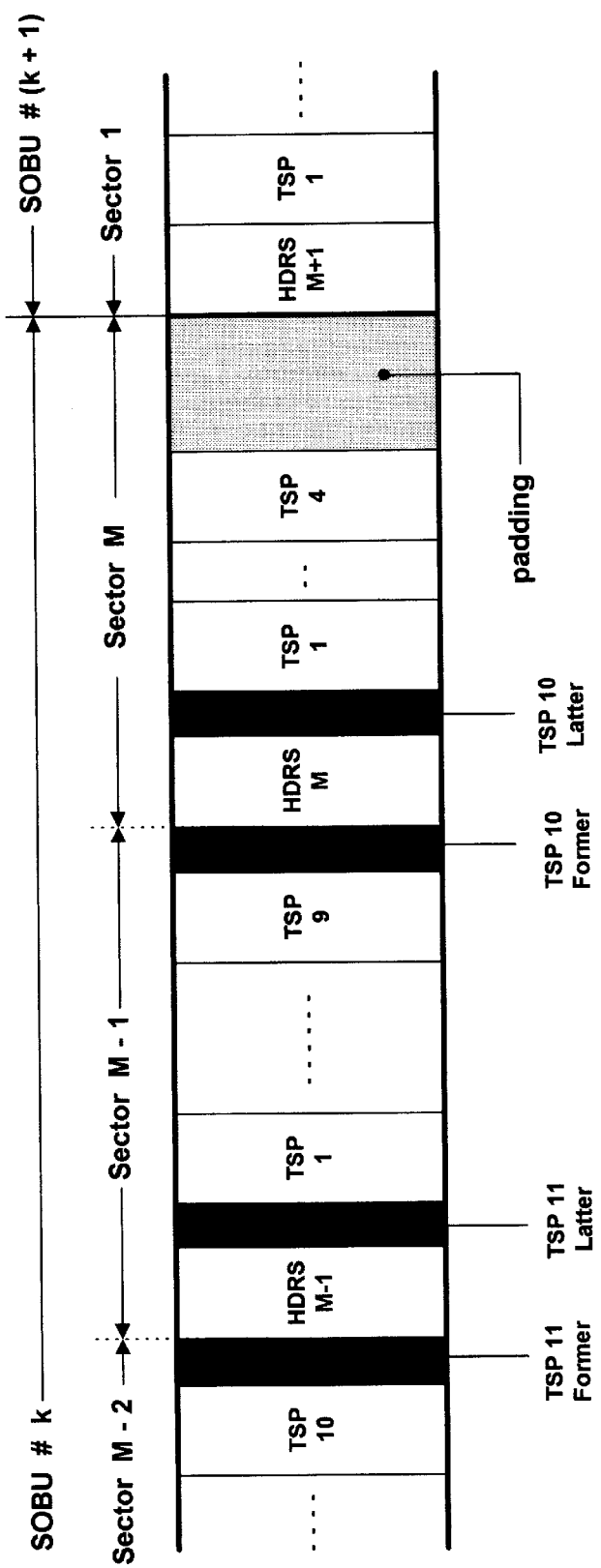
FIG. 5 is a pictorial representation of sectors and stream object units created by the recording method in accordance with the present invention.

FIG. 5 shows the syntax of sectors and stream object units created by the method of the present invention. The following explanation will refer to the digital data stream recording apparatus shown in FIG. 1.

Transports stream packets of a digital data stream received by the set top box 100 and transmitted through the IEEE-1394 communication interface are recorded sequentially on the recording medium 230 by a stream recording unit 220. When recording a received transport stream packet, a control unit 250 of the streamer 200 checks whether a 192-byte transport stream packet TSP10 can be added in the Sector M-1 in which the preceding transport stream packets (TSP1~TSP9) have been recorded, without exceeding the sector size, 2048bytes.

If it is concluded that the transport stream packet TSP10 cannot be added to the Sector M-1, the control unit 250 controls the stream recording unit 220 so that the transport stream packet TSP10 is recorded across two sectors Sector M-1 and Sector M by dividing the transport stream packet TSP10 into first and second parts. The size of the first part of the divided transport stream packet TSP10 is determined by the difference between the sector size of 2048 bytes and the size of transport stream packets previously recorded in the sector M-1. Therefore the sector M-1 is completely packed with transport stream packets without a remaining area. The second part of the divided transport stream packet TSP10 is recorded in the next sector, Sector M.

The received digital data stream is recorded on the recording medium 230 after being buffered. When recording the Sector M-1 on the recording medium 230, the control unit 250 records the information on the divided transport stream packet TSP10 in the application header information. For example, the size of the second part of the transport stream packet TSP10 can be recorded in the COM_SZ field representing the size of a divided transport stream packet. If the second part of the transport stream packet TSP10 has a size of 30 bits, a value of '011110' is written in the COM_SZ field. The application header information is recorded on the recording medium 230 along with the Sector M-1.

Since transport stream packets are recorded in a sector with no padding area, the position of the first transport stream packet recorded in a sector without being divided is subject to change. Now that the size of the second part of the transport stream packet recorded across two sectors Sector M-1 and Sector M indicates the start position of the first sector recorded in the Sector M, the position of the first transport stream packet recorded in the Sector M without being divided can be found by the value of the COM_SZ field contained in the previous sector Sector M-1. Instead of recording the size of the second part of a divided transport stream packet in the header of the sector in which the first part of the divided transport stream packet is recorded, it can be recorded in the header of the next sector in which the second part of the transport stream packet is recorded.

According to the recording scheme, a 2048-byte sector may contain a 100-byte header information (HDRS), 10 192-byte transport stream packets, and one or two divided transport stream packets. If only one divided transport stream is contained, it can be positioned in the leading part or ending part of the sector.

In the application header information, the field of AP_PKT_Ns indicates the number of transport stream packets contained in the associated sector. In the conventional recording method, the number of transport stream packets contained in a sector is fixed as long as the size of a transport stream packet does not vary. In the recording method in accordance with the present invention, however, the number of transport stream packets contained in a sector may change.

When counting the number of transport stream packets contained in a sector, the leading bits of transport stream packets are counted for preventing double counting divided transport stream packets. If a data stream is recorded as in FIG. 5, the numbers of transport stream packets contained in the sectors Sector M-2, Sector M-1, and Sector M are 11, 10, and 4, respectively.

Suppose that a stream object unit comprises 32 sectors and the 31 sectors of a stream object unit SOBU#k have been created so far. When recording the 32nd sector of the stream object unit SOBU#k, it is checked whether the transport stream packet being recorded is the 324th transport stream packet. If so, the remaining area of the stream object unit SOBU#k after adding the 324th transport stream packet is padded with null data to make the size of the stream object unit SOBU#k 2048 bytes. Compared with the conventional recording method that creates 886 byte padding area, the recording method in accordance with the present invention dramatically increases the recording efficiency since only 128 bytes are used as the padding area in a sector.

The method for recording digital data streams in accordance with the present invention records received transport stream packets across sectors depending on the size of remaining areas of sectors and null data are inserted only into the last sector of each stream object unit, thereby minimizing the size of null data and increasing the recording efficiency.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for recording digital data streams, comprising the steps of:
   (a) recording received digital transport stream units sequentially in a sector which is a physical recording unit, each transport stream unit having a predetermined length;
   (b) checking whether the size of the remaining area of the sector is less than the length of a transport stream unit; and
   (c) recording a received transport stream unit across the remaining area of the sector and the next sector based upon the checked result.

2. The method set forth in claim 1, further comprising the step of:
   (d) recording information on the number of transport stream units contained in a sector, wherein the number varies based on a transport stream unit is recorded across two sectors.

3. The method set forth in claim 2, wherein said step (d) records said information on the number in a management information area pertaining to each sector.

4. The method set forth in claim 2, wherein said step (d) counts transport stream units contained in a sector based upon whether a leading bit of each transport stream unit has been recorded in the associated sector.

5. The method set forth in claim 4, wherein said step (d) only counts transport stream units whose leading bits have been recorded in the associated sector and records the counted number as the number of transport stream units contained in the associated sector.

6. The method set forth in claim 1, further comprising the a step of:
   (d) recording information on a start position of a first transport stream unit of a sector, the start position varying as a transport stream unit is recorded across two sectors.

7. The method set forth in claim 6, wherein said step (d) records said information on the start position in a management information area pertaining to each sector.

8. The method set forth in claim 6, wherein said information on the start position is information on the size of a latter part of a transport stream unit recorded across two sectors.

9. The method set forth in claim 8, wherein said information on the start position is recorded in a management information area of the sector in which the latter part of said transport stream unit is recorded.

10. The method set forth in claim 1, wherein said step (c) comprises the steps of:
    (c1) checking whether said sector is the last sector of a stream object unit, depending upon the checked result of said step (b);
    (c2) determining whether to record a transport stream unit across the remaining area of said sector and the next sector, depending upon the checked result of said step (c1); and
    (c3) recording the transport stream unit according to the determination result.

11. The method set forth in claim 10, wherein said step (c2) records a transport stream unit in the next sector instead of recording the transport stream unit across two sectors if said sector is the last sector of the stream object unit.

12. The method set forth in claim 11, wherein said step (c3) pads the remaining area of said sector with null data.

13. An apparatus for recording digital data streams, comprising:
    recording means for recording received digital transport stream units sequentially in a sector which is a physical recording unit, each transport stream unit having a predetermined length; and
    control means for checking whether the size of the remaining area of the sector is less than the length of a transport stream unit and controlling said recording means to record a transport stream unit across the remaining area of the sector and the next sector, based upon the checked result.

14. The apparatus set forth in claim 13, wherein said control means creates information on the number of transport stream units contained in a sector and controls said recording means to record the information, the number varying based on a transport stream unit is recorded across two sectors.

15. The apparatus set forth in claim 13, wherein said control means creates information on a start position of a first transport stream unit of a sector and controls said recording means to record the information, the start position varying as a transport stream unit is recorded across two sectors.

16. The apparatus set forth in claim 15, wherein said information on the start position is information on the size of a latter part of a transport stream unit recorded across two sectors.

17. An apparatus for recording digital data streams, comprising:
    a data receiver to receive digital transport stream units, each transport stream unit having a predetermined length;
    a data recorder to record digital transport stream units received from said data receiver sequentially in a sector of a recording medium which is a physical recording unit; and
    a controller to check whether the size of the remaining area of the sector is less than the length of a transport stream unit and to control said data recorder to record a transport stream unit received from said data receiver across the remaining area of the sector and the next sector, based upon the checked result.

18. The apparatus set forth in claim 17, wherein said controller creates information on the number of transport stream units contained in a sector and controls said data recorder to record the information, the number varying based on a transport stream unit recorded across two sectors by said data recorder.

19. The apparatus set forth in claim 17, wherein said controller creates information on a start position of a first transport stream unit of a sector and controls said data recorder to record the information, the start position varying as a transport stream unit is recorded across two sectors by said data recorder.

20. The apparatus set forth in claim 19, wherein said information on the start position is information on the size of a latter part of a transport stream unit recorded across two sectors.

* * * * *